United States Patent
Zhang et al.

(10) Patent No.: US 8,514,794 B2
(45) Date of Patent: *Aug. 20, 2013

(54) LOOP POWER CONTROLS FOR MULTI-CARRIER HIGH-SPEED UPLINK PACKET ACCESS

(75) Inventors: Danlu Zhang, San Diego, CA (US); Pavan Kumar Vitthaladevuni, San Diego, CA (US); Ravi Agarwal, San Diego, CA (US); Jilei Hou, San Diego, CA (US); Ozcan Ozturk, San Diego, CA (US); Arjun Bharadwaj, San Diego, CA (US); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 492 days.

This patent is subject to a terminal disclaimer.

(21) Appl. No.: 12/724,963

(22) Filed: Mar. 16, 2010

(65) Prior Publication Data

US 2010/0238825 A1    Sep. 23, 2010

Related U.S. Application Data

(60) Provisional application No. 61/160,902, filed on Mar. 17, 2009.

(51) Int. Cl.
*H04W 4/00* (2009.01)
(52) U.S. Cl.
USPC .......................................... 370/329; 455/522
(58) Field of Classification Search
USPC ........... 370/252, 329, 310, 312, 335; 455/69, 455/522
See application file for complete search history.

(56) References Cited

U.S. PATENT DOCUMENTS

| 5,991,284 | A | 11/1999 | Willenegger et al. |
| 6,785,558 | B1 | 8/2004 | Stratford et al. |
| 2001/0006888 | A1* | 7/2001 | Posti et al. ...................... 455/69 |
| 2006/0003787 | A1 | 1/2006 | Heo et al. |

(Continued)

FOREIGN PATENT DOCUMENTS

| EP | 1655868 A1 | 5/2006 |
| EP | 1793509 A1 | 6/2007 |

(Continued)

OTHER PUBLICATIONS

Ericsson: "DC-HSUPA power scaling" 3GPP Draft; R1-091894 DC-HSUPA Power Scaling, 3rd Generation Partnership Project (3GPP), Mobile Competence Centre ; 650, Route Des Lucioles ; F-06921 Sophia-Antipolis Cedex ; France, no. San Francisco, USA; 20090428, Apr. 28, 2009, XP050339385.

(Continued)

*Primary Examiner* — Albert T Chou
(74) *Attorney, Agent, or Firm* — Darren M. Simon

(57) ABSTRACT

A method for wireless communications is provided. The method includes applying independent power controls to two or more carriers from a set of high speed packet access signals. The method includes monitoring power across the two or more carriers to determine power levels for the set of high speed packet access signals. The method also includes adjusting at least one of an open loop control, an inner loop control, or an outer loop control in view of the power levels for the set of packet access signals.

37 Claims, 11 Drawing Sheets

(56) References Cited

U.S. PATENT DOCUMENTS

| | | | |
|---|---|---|---|
| 2007/0019589 A1* | 1/2007 | Attar et al. | 370/335 |
| 2007/0077956 A1* | 4/2007 | Julian et al. | 455/522 |
| 2007/0173278 A1* | 7/2007 | Yoon et al. | 455/522 |
| 2009/0168686 A1* | 7/2009 | Love et al. | 370/312 |
| 2010/0202331 A1* | 8/2010 | Zhang et al. | 370/310 |
| 2010/0273520 A1 | 10/2010 | Pelletier et al. | |
| 2010/0322090 A1 | 12/2010 | Zhang et al. | |

FOREIGN PATENT DOCUMENTS

| | | |
|---|---|---|
| JP | 2005045504 A | 2/2005 |
| JP | 2009505446 A | 2/2009 |
| JP | 2009505564 A | 2/2009 |
| RU | 2006108531 A | 7/2006 |
| WO | 2005018125 A1 | 2/2005 |
| WO | 2010068487 | 6/2010 |
| WO | 2010091422 | 8/2010 |

OTHER PUBLICATIONS

International Search Report and Written Opinion—PCT/US2010/027661, International Search Authority—European Patent Office—Jun. 21, 2010.

Nokia et al: "Power scaling in dual carrier HSUPA" 3GPP Draft; R1-092080, 3RD. Generation Partnership Project (3GPP), Mobile Competence Centre ; 650, Route Des Lucioles ; F-06921 Sophia-Antipolis Cedex; France, no. San Francisco, USA; 20090429, Apr. 29, 2009, XP050339531.

* cited by examiner

LOOP POWER CONTROLS FOR MULTI-CARRIER HIGH-SPEED UPLINK PACKET ACCESS

CLAIM OF PRIORITY UNDER 35 U.S.C. §119

This application claims the benefit of U.S. Provisional Patent Application No. 61/160,902, entitled POWER CONTROL IN MULTI-CARRIER HSUPA, and filed on Mar. 17, 2009, the entirety of which is incorporated herein by reference.

BACKGROUND

I. Field

The following description relates generally to wireless communications systems, and more particularly to providing loop power controls for multiple carriers associated with High-Speed Uplink Packet Access (HSUPA).

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems including E-UTRA, and orthogonal frequency division multiple access (OFDMA) systems.

An orthogonal frequency division multiplex (OFDM) communication system effectively partitions the overall system bandwidth into multiple ($N_F$) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the $N_F$ frequency subcarrier. Thus, OFDM may be used to combat inter-symbol interference (ISI) caused by frequency selective fading, which is characterized by different amounts of attenuation across the system bandwidth.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

One issue with wireless systems relates to multicarrier controls for high-speed uplink packet access (HSUPA). In general, HSUPA employs a packet scheduler, but operates on a request-grant principle where user equipment or devices can request permission to send data and a scheduler decides when and how many devices will be allowed to do so. A request for transmission contains data about the state of the transmission buffer and queue at the device and its available power margin. In addition to this scheduled mode of transmission applicable standards also allow a self-initiated transmission mode from the devices, denoted non-scheduled. Additionally, non-independent control over the carriers made it difficult to regulate power among the carriers and control interference between devices and/or channels. Moreover, in addition to non-independent control, multicarrier control systems did not have the capability to properly scale power allocations between carriers when conditions dictated. Such lack of control independence and scaling made it exceedingly difficult to deliver the quality of service desired.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Systems and methods provide loop power controls across multiple wireless carriers in an independent manner for high-speed packet access networks. In one aspect, open loop power controls are provided to control power across the multiple carriers. Such controls are typically applied to initial power settings such as for the physical random access channel (PRACH) and dedicated physical control channel (DPCCH) power settings, for example. In another aspect, inner or closed loop control loops are provided for carrier power controls. These can include bit feedback from Node B or transmitting stations to user equipment (UE), where received noise signals can be compared to set-points enabling power up or power down commands to be sent to the respective UE to dynamically adjust power (up or down) for a carrier or across a set of carriers. In yet another aspect, outer loop controls can be provided to further control power across multiple high speed carriers. The outer loop power controls are generally communicated by a radio network controller (RNC) to the Node B via a network interface. A separate algorithm can be provided per carrier, where a power setpoint generated by the RNC is determined for each carrier by data performance on the respective carrier.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Systems and methods are provided to control power across multiple carriers in a wireless network. In one aspect, a method for wireless communications is provided. The method includes applying independent power controls to two or more carriers from a set of high speed packet access signals. The method includes monitoring power across the two or more carriers to determine power levels for the set of high speed packet access signals. The method also includes adjusting at least one of an open loop control, an inner loop control, or an outer loop control in view of the power levels for the set of packet access signals.

It is noted that in one or more exemplary embodiments described herein, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media.

Figure 1:
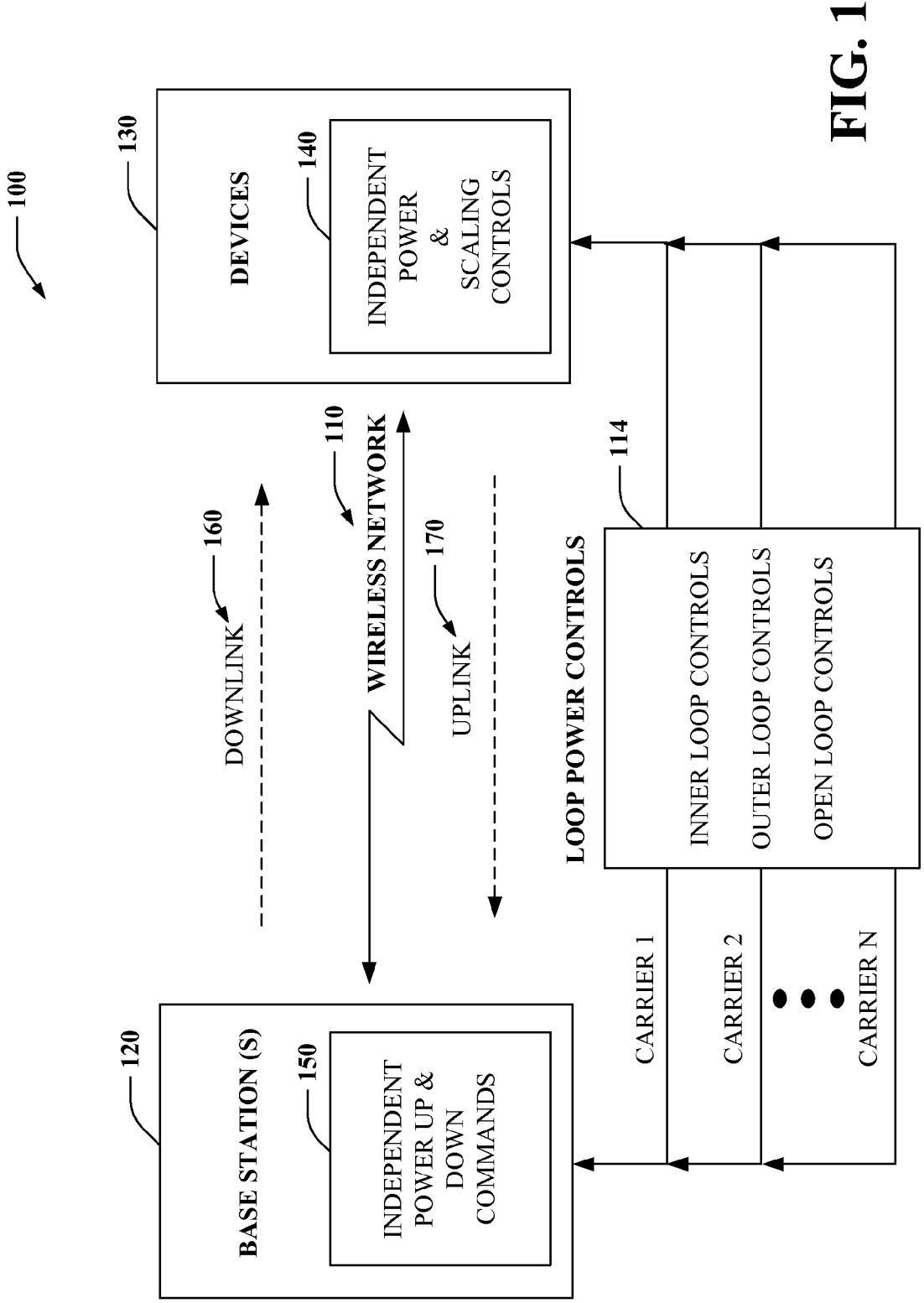
FIG. 1 is a high level block diagram of a system that provides independent multicarrier loop power control for a wireless communications system.

Referring now to FIG. 1, a system 100 provides loop power control for a wireless communications network 110, where multiple loop controls 114 are employed to regulate transmit power of user equipment in an independent manner between multiple carriers. The system 100 includes one or more base stations 120 (also referred to as a node, evolved node B-eNB, serving eNB, target eNB, femto station, pico station) which can be an entity capable of communication over the wireless network 110 to various devices 130. For instance, each device 130 can be an access terminal (also referred to as terminal, user equipment, mobility management entity (MME) or mobile device). The device 130 can include independent power and scaling controls 140 that are provided to manage power across multiple wireless carriers. Such controls 140 respond to power up or down commands 150 emanating from the base station 120. For instance, at 114, various loop controls may be provided that are independently controlled (e.g., each carrier having separate loop control). As shown, the loop controls 114 can include inner loop controls, outer loop controls, and/or open loop controls for dynamically adjusting power across the carrier set (individually and/or collectively).

As shown, the base station 120 communicates to the device 130 (or devices) via downlink 160 and receives data via uplink 170. Such designation as uplink and downlink is arbitrary as the device 130 can also transmit data via downlink and receive data via uplink channels. It is noted that although two components 120 and 130 are shown, that more than two components can be employed on the network 110, where such additional components can also be adapted for the loop power control described herein. It is further noted that although the controls 140 typically apply to a high speed uplink packet access (HSUPA) systems, such controls can also apply to high speed downlink packet access (HSDPA) or other wireless protocols as well.

In general, the loop controls 114, 140, and 150 regulate power settings across multiple wireless carriers in an independent manner for high-speed packet access networks. In one aspect, a power control method for wireless carriers is provided, where independent loop controls 114 can be applied to one or more carriers of a multicarrier set. The method includes responding to power up and power down commands 150 across multiple carriers and dividing allowed power allocation across at least two wireless carriers in response to the power up and power down commands. Thus, the system 100 provides loop power controls 114 across multiple wireless carriers in an independent manner for high-speed packet access networks. In one aspect, open loop power controls at 114 are provided to control power across the multiple carriers. Such controls are typically applied to initial power settings such as for the physical random access channel (PRACH) and dedicated physical control channel (DPCCH) power settings, for example as will be described in more detail below with respect to FIG. 3.

Figure 4:
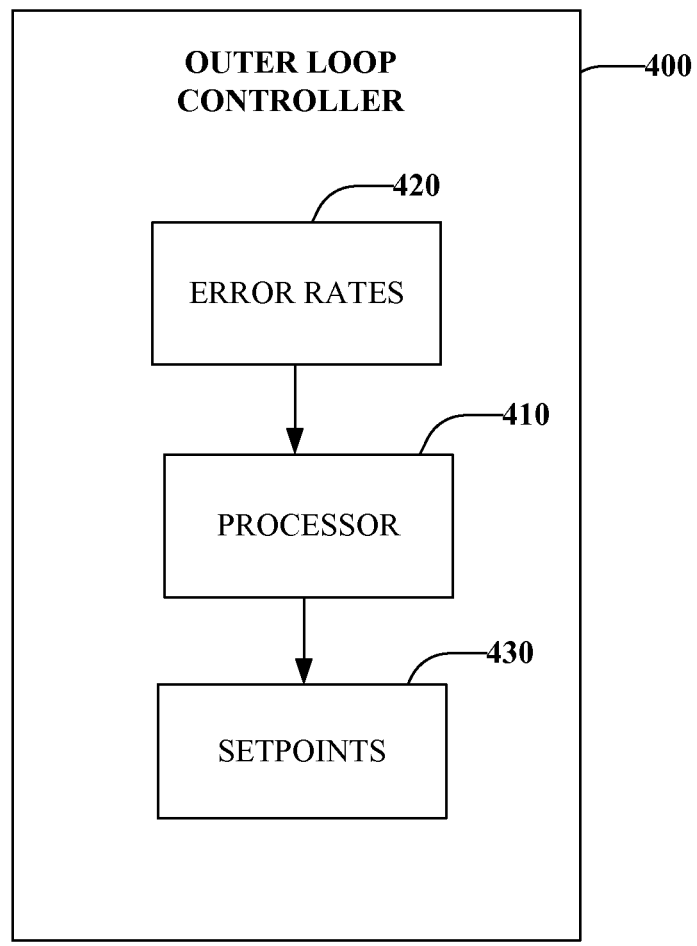
FIG. 4 illustrates an outer loop controller for a wireless communications system.

In another aspect, inner control loops are provided at 114 for carrier power controls. These can include bit feedback from Node B or transmitting stations to user equipment (UE), where received noise signals can be compared to set-points enabling power up or power down commands to be sent to the respective UE to dynamically adjust power (up or down) for a carrier or across a set of carriers. In yet another aspect, outer loop controls can be provided at 114 to further control power across multiple high speed carriers. The outer loop power controls which are described in more detail with respect to FIG. 4 are generally communicated by a radio network controller (RNC) to the Node B via a network interface (e.g., Iub interface). A separate algorithm can be provided per carrier, where a power setpoint generated by the RNC is determined for each carrier by data performance on the respective carrier. The loop power controls 114 will be shown and described in more detail below with respect to FIG. 2.

It is noted that the system 100 can be employed with an access terminal or mobile device, and can be, for instance, a module such as an SD card, a network card, a wireless network card, a computer (including laptops, desktops, personal digital assistants (PDAs)), mobile phones, smart phones, or any other suitable terminal that can be utilized to access a network. The terminal accesses the network by way of an access component (not shown). In one example, a connection between the terminal and the access components may be wireless in nature, in which access components may be the base station and the mobile device is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, or the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

Figure 2:
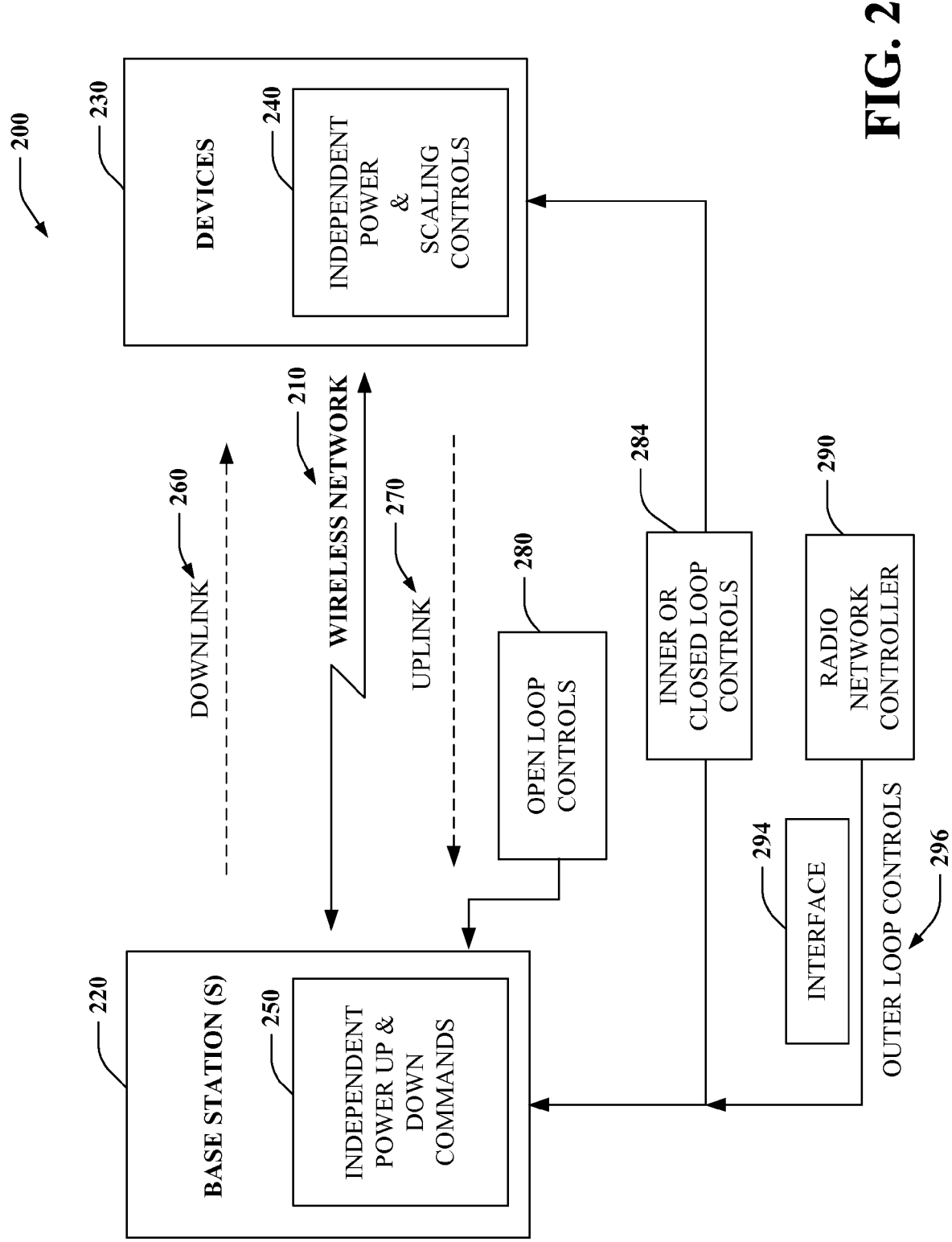
FIG. 2 is a diagram that illustrates open loop, outer loop, and inner loop controls in a wireless communications system.

Referring now to FIG. 2, a system 200 illustrates detailed loop controls for a multicarrier wireless system. Similar to above, the system 200 includes one or more base stations 220 which can be an entity capable of communication over the wireless network 210 to various devices 230. For instance, each device 230 can be an access terminal (also referred to as terminal, user equipment, mobility management entity (MME) or mobile device). The device 230 can include independent power and scaling controls 240 that are provided to manage power across multiple wireless carriers. Such controls 240 respond to power up or down commands 250 emanating from the base station 220. As shown, the base station 220 communicates to the device 230 (or devices) via downlink 260 and receives data via uplink 270.

As illustrated, an open loop control 280 can be provided in addition to an inner loop or closed loop control at 284. A radio network controller (RNC) 290 and interface 294 (e.g., Iub interface) form an outer loop control 296. In general, power control is utilized in managing interference in CDMA systems including WCDMA/HSPA. Uplink power control in WCDMA uplink and HSUPA can generally three loops although other loops are possible (e.g., nested loops). Open-loop control 280 is generally applicable to initial power. Closed loop control 284 generally employs one bit feedback from the Node B 220 to UE 230 although more than one bit can be utilized. Node B 220 compares the received pilot SINR (signal to noise ration) to a set point and sends 'up' and 'down' command using one bit per slot, for example. The UE 230 adjusts its power by 1 dB step up or down (or other incremental value) depending on the command. The UE 230 reduces its power as long as one Node B in its active set sends it a 'down' command. The outer-loop 296 set point used by Node B 220 in closed-loop is determined by the RNC 290. The set point can be based on packet error rate on the data channels, for example.

It is noted that, instantaneous channel power variations may not totally correlated even across two adjacent carriers. Therefore, each of the two or more uplink carriers should have a separate inner-loop power control 284. The uplink power control commands sent by the Node B 220 are carried on either DPCH or F-DPCH on the anchor downlink carrier and on F-DPCH on the downlink carrier paired with the secondary uplink. The maximum transmit power of the UE 230, after back-off due to cubic metric constraint, is shared between the two uplink carriers. When the UE 230 total transmit power is within the power control step size to the maximum transmit power, the UE scales its power between the carriers and among the channels on each carrier. New control rules can be provided for the power scaling between the carriers while utilizing current rules on the power scaling among the channels on each carrier.

The UE 230 receives two sets of power control bits, one for each carrier during each TPC command combining period. The UE 230 first derives one TPC command for each carrier per the current rule. If both commands are 'down', the UE 230 applies the power reduction on both carriers. In this case, no new rules are needed. If only one of the two commands is 'down', the UE 230 first applies the power reduction on the corresponding carrier before it applies the power increase on the other carrier. If the UE does not have enough power to increase its power by the power control step size on the carrier with the 'up' command, the UE scales its power on all the channels on this carrier following current rules.

If both commands are 'up', and if the UE 230 has enough power to follow both commands, the UE applies the power increase to both carriers. If the UE 230 does not have enough power to follow both commands, there are at least three options for the UE to allocate its power between the carriers:

1. The UE increases its power by the same proportion on each carrier so that the maximum transmit power is met.
2. The UE first increases its power as much as possible on the anchor carrier and then increases its power on the secondary carrier so that the maximum transmit power is met.
3. The UE first increases its power as much as possible on the carrier with lower transmit DPCCH transmit power and then increases its power on the other carrier so that the maximum transmit power is met Option 1 is the most straight-forward where Option 2 has the following advantages:
    DPCCH and DPDCH power on the anchor carrier will be preserved just as in the single carrier case
    HS-DPCCH is protected better if HS-DPCCH for both carriers are sent only on the anchor.

Option 3 can result in improved total received SINR for the data channels at the base station 220 and therefore better total data throughput. Similar rules can be applied for transmit power.

For outer loop control 296, the addition of the second carrier calls for possible Iub signaling changes. Thus, separate outer-loops can be provided for the two (or more) carriers. This is motivated by robustness considerations since fading, interference variations and data rates on the two carriers can be different.

For open loop power control 280, the open-loop power control in a single carrier system can be used to set both the initial PRACH transmit power and the initial DPCCH transmit power. Since there is no PRACH sent by the UE on the secondary uplink carrier, no changes are needed regarding the power control for PRACH. With a single-carrier uplink, upon establishing the DPCCH, the UE determines its initial DPCCH transmit power using the following example formula:

$$DPCCH\ Initial\_power = DPCCH\_Power\_offset - CPICH\_RSCP$$

This formula can remain for the anchor uplink carrier. If the secondary uplink carrier is established after the anchor, the UE 230 can cause the initial DPCCH transmit power on the secondary carrier to be similar as the instantaneous DPCCH transmit power on the anchor carrier. Since the two uplink carriers are adjacent, the channel condition of the secondary uplink carrier is more correlated with the channel condition of the uplink anchor carrier than with the channel conditions of the downlink carrier paired with the secondary uplink. Furthermore, the accuracy of CPICH_RSCP measurement may not be as good as that of DPCCH transmit power (find reference). Therefore, using the instantaneous DPCCH transmit power on the anchor carrier as the initial DPCCH transmit power on the second carrier, results in faster convergence of the inner loop power control 284 after the initial DPCCH transmission.

Figure 3:
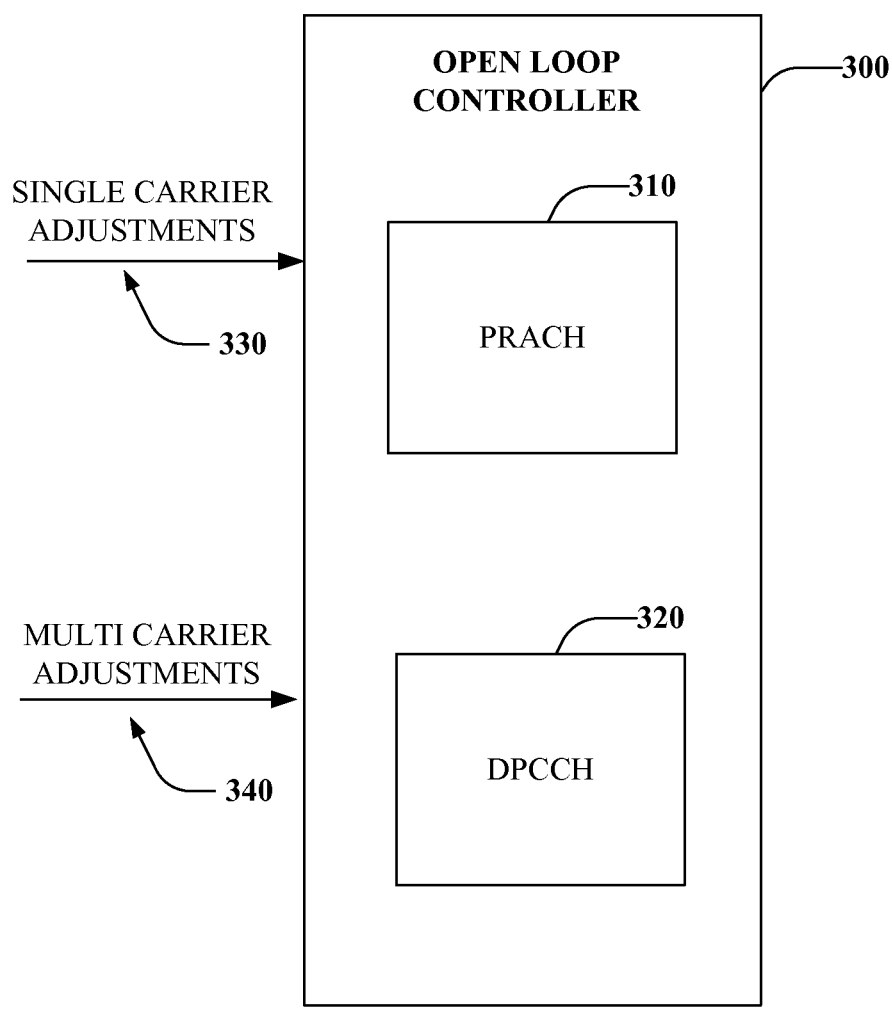
FIG. 3 illustrates an open loop controller for a wireless communications system.

Referring now to FIG. 3, an open loop controller 300 is illustrated. Open loop power control can be employed to determine initial power for a physical random access channel (PRACH) 310 and a dedicated physical control channel DPCCH 320. In multi-carrier HSUPA, there are generally two uplink carriers. One option is not to have PRACH on the secondary carrier. Thus a radio resource control (RRC) setup will come through Radio Bear Setup on the anchor. This mode is more beneficial when the two carriers are adjacent, or carriers with small separation. However, the secondary carrier still should compute its initial power for DPCCH 320. Anchor carrier open-loop follows current 3GPP specifications. The secondary uplink carrier starts later than the anchor so its initial power could be dependent on the anchor DPCCH power.

For single carrier operations at 330, anchor carrier open-loop follows the current 3GPP specification. Initial PRACH TX Power=Primary CPICH TX power−CPICH RSCP+Uplink Interference+Constant value, where initial PRACH TX Power depends on the downlink measurements (CPICH RSCP) and parameters from the system broadcast. The DPCCH_Initial_power=DPCCH_Power_offset−CPICH_RSCP, where DPCCH_Initial_power has similar dependence. The values computed as such may not be accurate due to imbalance in uplink and downlink. However, without established uplink, the UE may have no other options.

For multicarrier considerations at 340, when the secondary carrier is configured, the RRC connection is up and the anchor carrier transmit power has converged to its desired value. In the case of adjacent carriers, or carriers with small separation, let initial DPCCH transmit power on the secondary carrier=instantaneous DPCCH transmit power on the anchor carrier+a margin where:

The imbalance between the two carriers is much smaller than uplink-downlink imbalance if the carriers have small distance. The margin there is to provide good initial data performance on the secondary carrier even if its channel is worse than the anchor, and the margin is chosen to tradeoff excessive power versus small decoding error probability.

Referring now to FIG. 4, an outer loop controller 400 is provided for a wireless system. The outer loop controller includes a processor 410 that inputs data error rates 420 and generates one or more carrier power set points 430. As noted previously, the RNC (radio network controller) informs Node B on the set point through messages on the Iub interface, for example. The typical outer-loop algorithm maintains the packet error rate of a certain data channel by adjusting the set point (SINR threshold in close-loop power control) based on the data packet decoding result. If a packet is successfully decoded, the set point is decreased by a 'down step'; otherwise, the set point increases by a 'up step.' The ratio between 'up step' and 'down step' is determined by the desired packet error rate (PER):

'up step'/'down step'=(1-PER)/PER, Since PER <<1, 'up step'>>'down step' where Set point can be dependent on the following factors:
  Multi-path delay profile
  Fading speed (this is related to carrier frequency)
  Variation in the interference
  Data rate: higher data rate tends to require higher set point unless the ratio between traffic channel power and pilot power (T2P) is carefully optimized. With multiple carriers, the latter three factors could be different on different carriers.

With multiple-carriers on the uplink, there should be a separate set point for each carrier to allow maximum flexibility for the Node B scheduler for:
  fading speed (Doppler frequency), interference variation and data rates may vary across carriers
  For example, one carrier may carry VoIP data where low set point is desirable; the other carrier may carry high rate data which requires higher set point
  Furthermore, the RNC can determine all the set points in a joint algorithm in which the set point on each carrier depends on the transmission results on all the carriers (or carrier subset).

There is typically a set point 430 for each carrier. The multiple set points are determined by the RNC and communicated to Node B over the Iub interface. One algorithm is a separate algorithm per carrier, namely, the set point on each carrier will be determined by the data performance on each carrier itself. The RNC can also cause the set point on each carrier to be dependent on the transmission results on the carriers. For example, if the data rates over the two carriers are close and multiple carriers are close in frequency, the RNC can cause the set points on different carriers to be the same. The set point can be determined by checking the overall data packet error rate over all the carriers. If the data rates across carriers are far apart, there may be good reason to assume different set points. In this case, the set point on each carrier can be determined by the data performance on each carrier itself.

Figure 5:
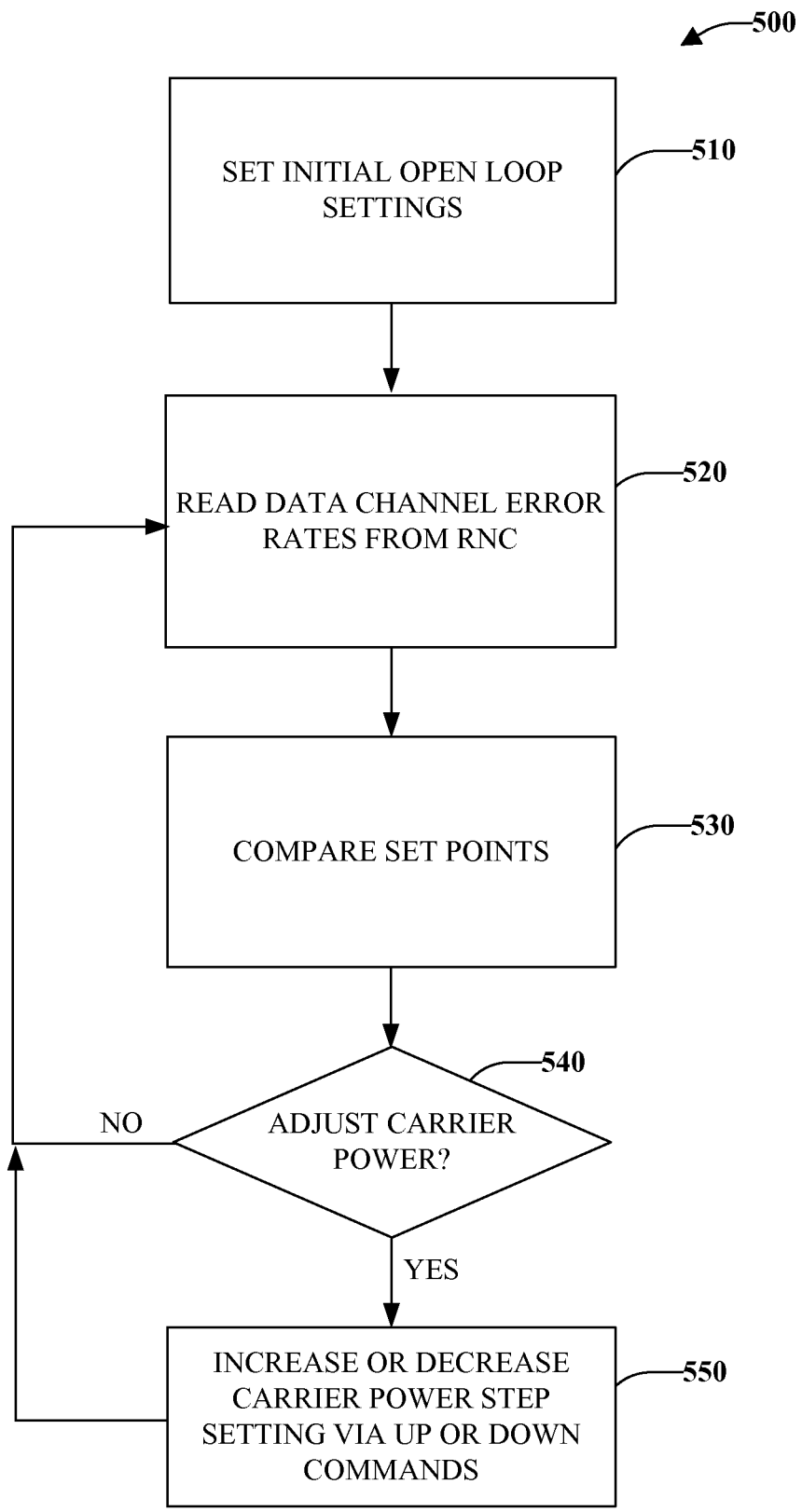
FIG. 5 illustrates a method for multicarrier loop power control for a wireless communications system.

Referring now to FIG. 5, an example loop control methodology is illustrated. While, for purposes of simplicity of explanation, the methodology (and other methodologies described herein) are shown and described as a series of acts, it is to be understood and appreciated that the methodology is not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter. In general, the methodologies can be implemented as processor instructions, logical programming functions, or other electronic sequence that supports independent multicarrier power control described herein.

Referring to the process 500 of FIG. 5, initial open loop settings are provided and adjusted to desired levels. Such controls are typically applied to initial power settings such as for the physical random access channel (PRACH) and dedicated physical control channel (DPCCH) power settings, for example. At 520, error data rates are read. This can include signal to noise data that is processed for each carrier in the multicarrier system. At 530, various set points are analyzed. Such set points can be provided by a Radio Network Controller for example as part of an outer loop control. At 540, a determination is made as to whether or not to adjust carrier power. If no adjustment is required at 540, the process proceeds back to 530 to monitor data channel performance. If an adjustment is required at 540, the process proceeds to 550 and generates one or more power up or one or more power down command per the respective carrier channel. As noted previously, such commands can be generated as part of inner or closed loop power controls. These can include bit feedback from Node B or transmitting stations to user equipment (UE), where received noise signals can be compared to set-points enabling power up or power down commands to be sent to the respective UE at 550 to dynamically adjust power (up or down) for a carrier or across a set of carriers. Working in conjunction with the inner or closed-loop controls, outer loop controls can be provided to further control power across multiple high speed carriers. The outer loop power controls are generally communicated by a radio network controller (RNC) to the Node B via a network interface. A separate algorithm can be provided per carrier, where a power setpoint generated by the RNC is determined for each carrier by data performance on the respective carrier.

Figure 6:
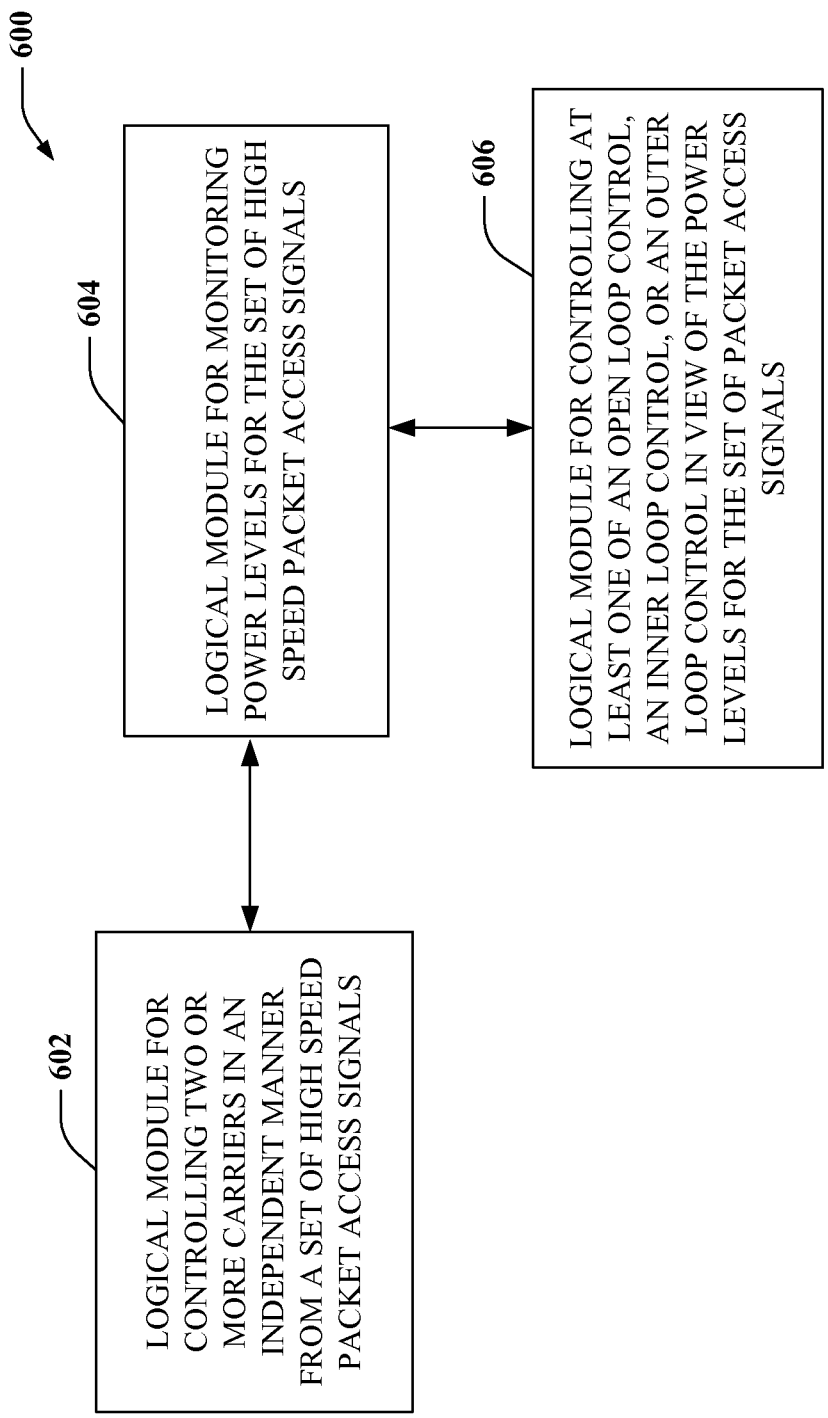
FIG. 6 illustrates an example logical module for multicarrier loop power control.
Figure 7:
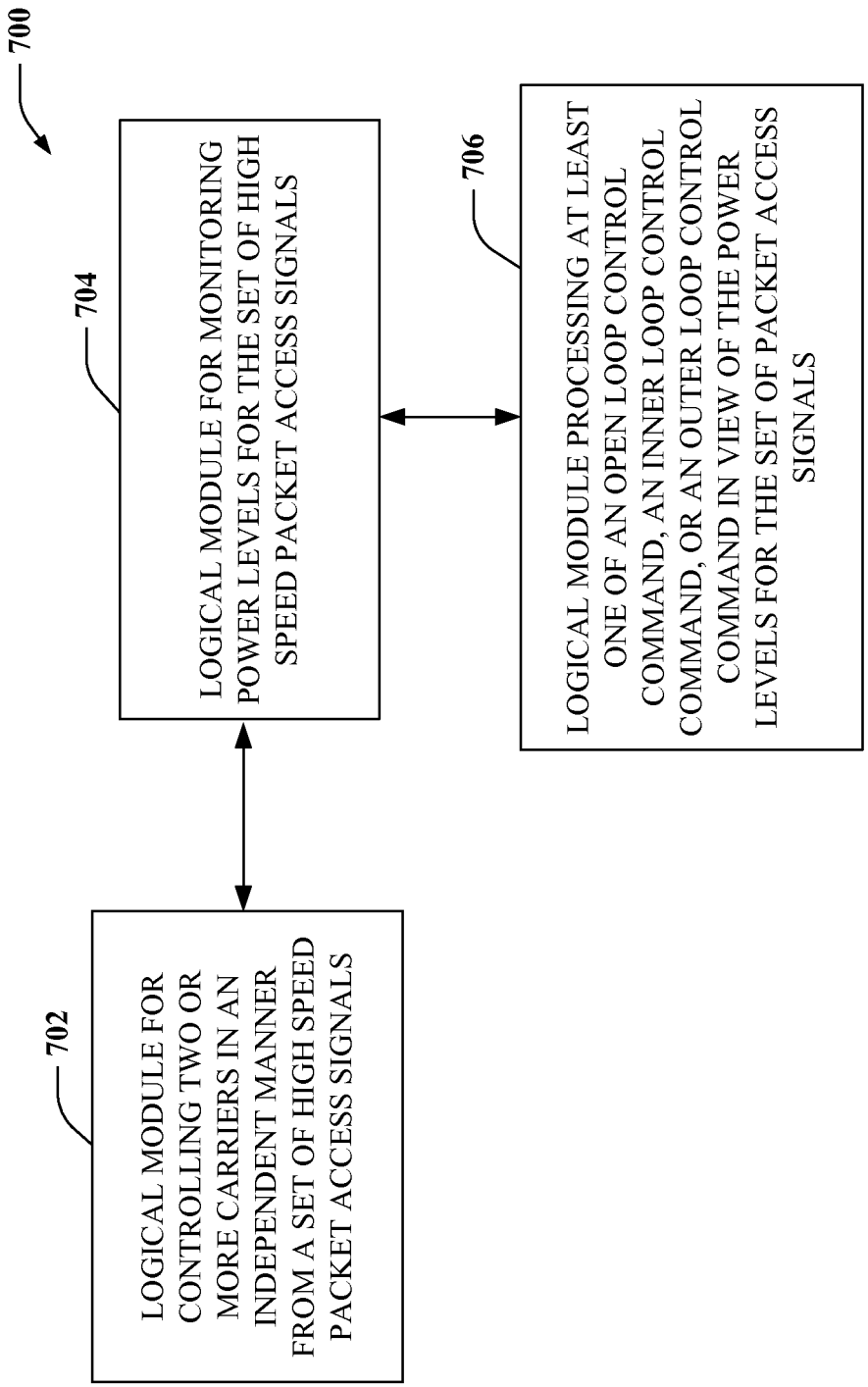
FIG. 7 illustrates an example logical module for alternative multicarrier loop power control.

Turning now to FIGS. 6 and 7, a system is provided that relates to wireless signal processing. The system is represented as a series of interrelated functional blocks, which can represent functions implemented by a processor, software, hardware, firmware, or any suitable combination thereof.

Referring to FIG. 6, a wireless communication system 600 is provided. The system 600 includes a logical module 602 or means for controlling two or more carriers in an independent manner from a set of high speed packet access signals. This includes a logical module 604 or means for monitoring power levels for the set of high speed packet access signals. This includes a logical module 606 or means for controlling at least one of an open loop control, an inner loop control, or an outer loop control in view of the power levels for the set of packet access signals.

Referring to FIG. 7, a wireless communication system 700 is provided. The system 700 includes a logical module 702 or means for controlling two or more carriers in an independent manner from a set of high speed packet access signals. This includes a logical module 704 or means for monitoring power levels for the set of high speed packet access signals. This also includes a logical module 706 or means for processing at least one of an open loop control command, an inner loop control command, or an outer loop control command in view of the power levels for the set of packet access signals.

Figure 8:
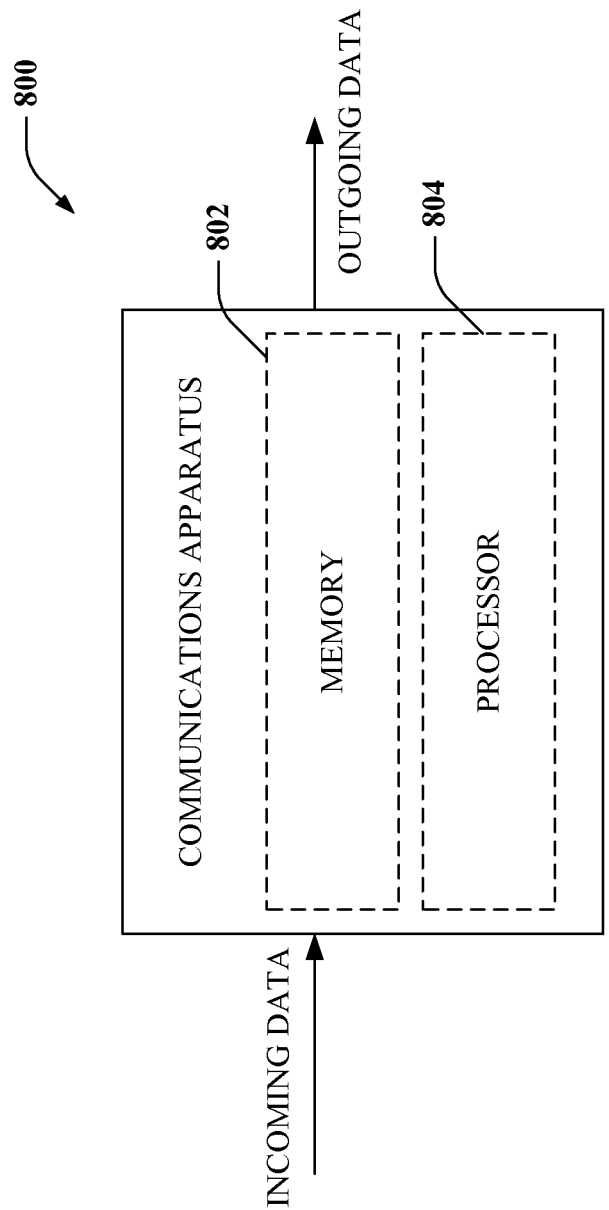
FIG. 8 illustrates an example communications apparatus that employ multicarrier power control.

FIG. 8 illustrates a communications apparatus 800 that can be a wireless communications apparatus, for instance, such as a wireless terminal. Additionally or alternatively, communications apparatus 800 can be resident within a wired network. Communications apparatus 800 can include memory 802 that can retain instructions for performing a signal analysis in a wireless communications terminal. Additionally, communications apparatus 800 may include a processor 804 that can execute instructions within memory 802 and/or instructions received from another network device, wherein the instructions can relate to configuring or operating the communications apparatus 800 or a related communications apparatus.

Figure 9:
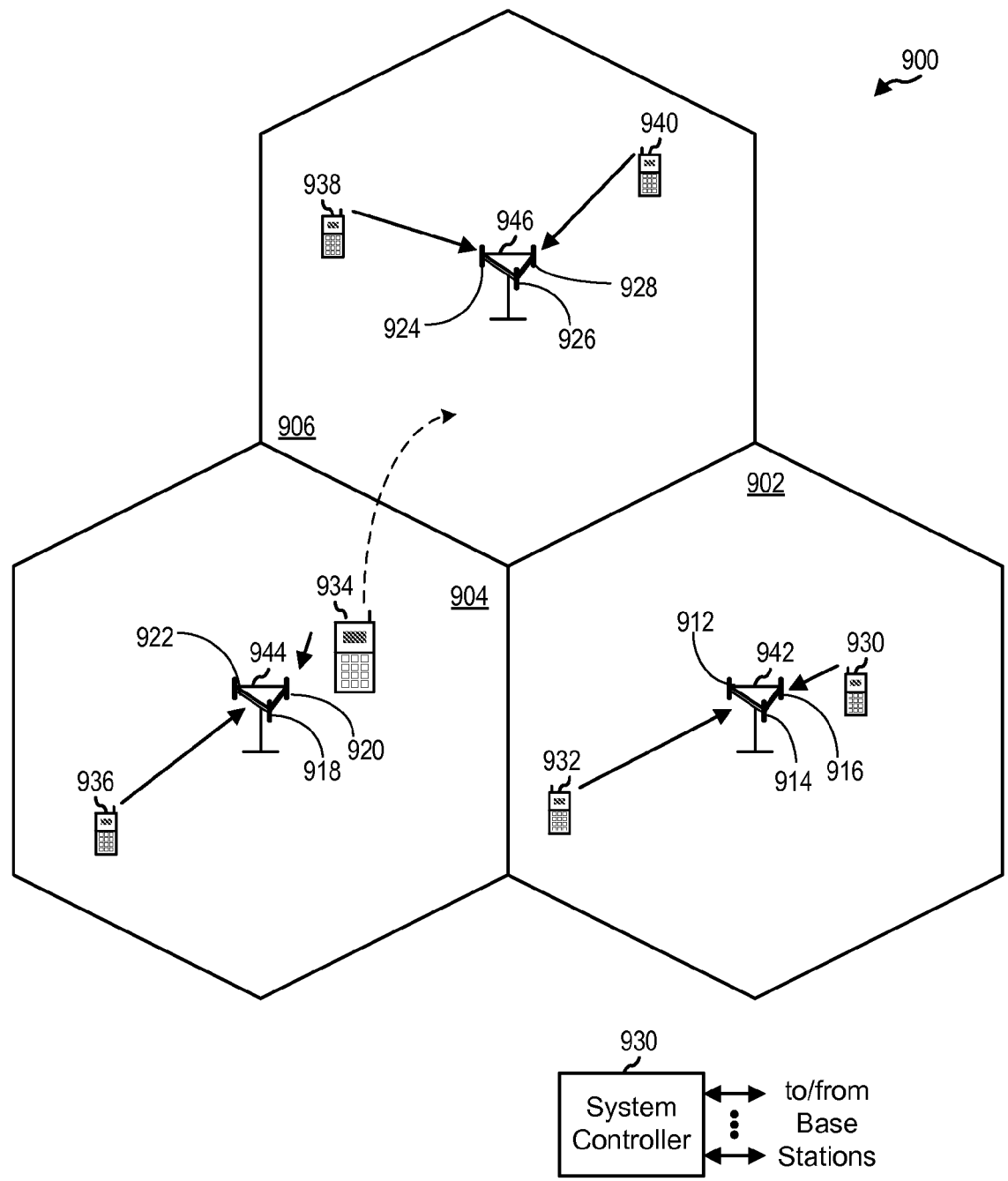
FIG. 9 illustrates a multiple access wireless communication system.

Referring to FIG. 9, a multiple access wireless communication system 900 is illustrated. The multiple access wireless communication system 900 includes multiple cells, including cells 902, 904, and 906. In the aspect the system 900, the cells 902, 904, and 906 may include a Node B that includes multiple sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 can include several wireless communication devices, e.g., User Equipment or UEs, which can be in communication with one or more sectors of each cell 902, 904 or 906. For example, UEs 930 and 932 can be in communication with Node B 942, UEs 934 and 936 can be in communication with Node B 944, and UEs 938 and 940 can be in communication with Node B 946.

Figure 10:
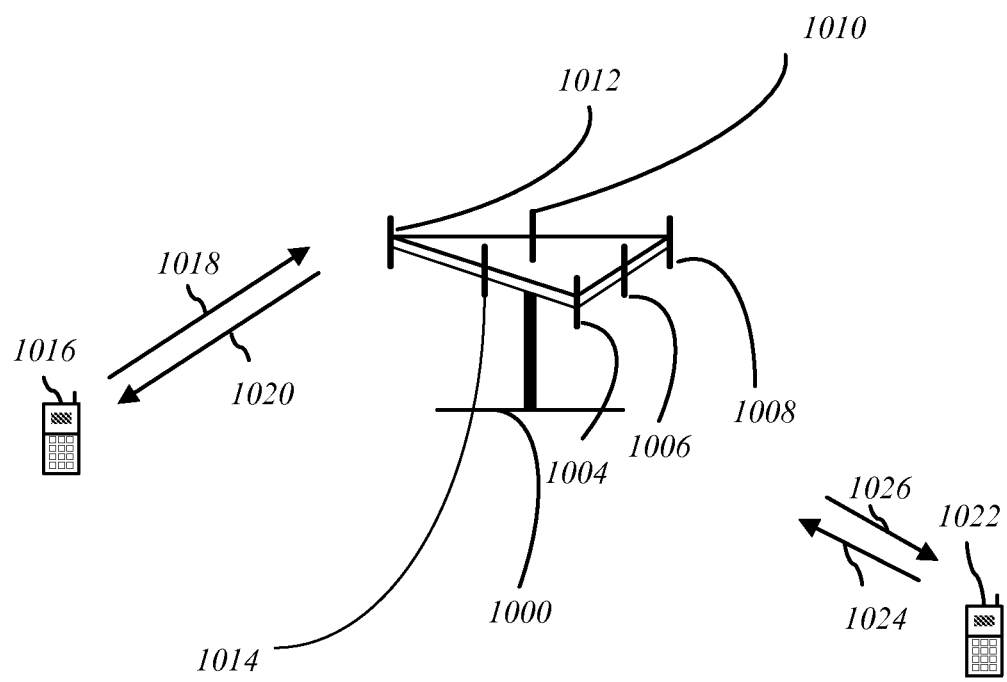
FIGS. 10 and 11 illustrate example communications systems.

Referring now to FIG. 10, a multiple access wireless communication system according to one aspect is illustrated. An access point 1000 (AP) includes multiple antenna groups, one including 1004 and 1006, another including 1008 and 1010, and an additional including 1012 and 1014. In FIG. 10, only two antennas are shown for each antenna group, however, more or fewer antennas may be utilized for each antenna group. Access terminal 1016 (AT) is in communication with antennas 1012 and 1014, where antennas 1012 and 1014 transmit information to access terminal 1016 over forward link 1020 and receive information from access terminal 1016 over reverse link 1018. Access terminal 1022 is in communication with antennas 1006 and 1008, where antennas 1006 and 1008 transmit information to access terminal 1022 over forward link 1026 and receive information from access terminal 1022 over reverse link 1024. In a FDD system, communication links 1018, 1020, 1024 and 1026 may use different frequency for communication. For example, forward link 1020 may use a different frequency then that used by reverse link 1018.

Each group of antennas and/or the area in which they are designed to communicate is often referred to as a sector of the access point. Antenna groups each are designed to communicate to access terminals in a sector, of the areas covered by access point 1000. In communication over forward links 1020 and 1026, the transmitting antennas of access point 1000 utilize beam-forming in order to improve the signal-to-noise ratio of forward links for the different access terminals 1016 and 1024. Also, an access point using beam-forming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 11:
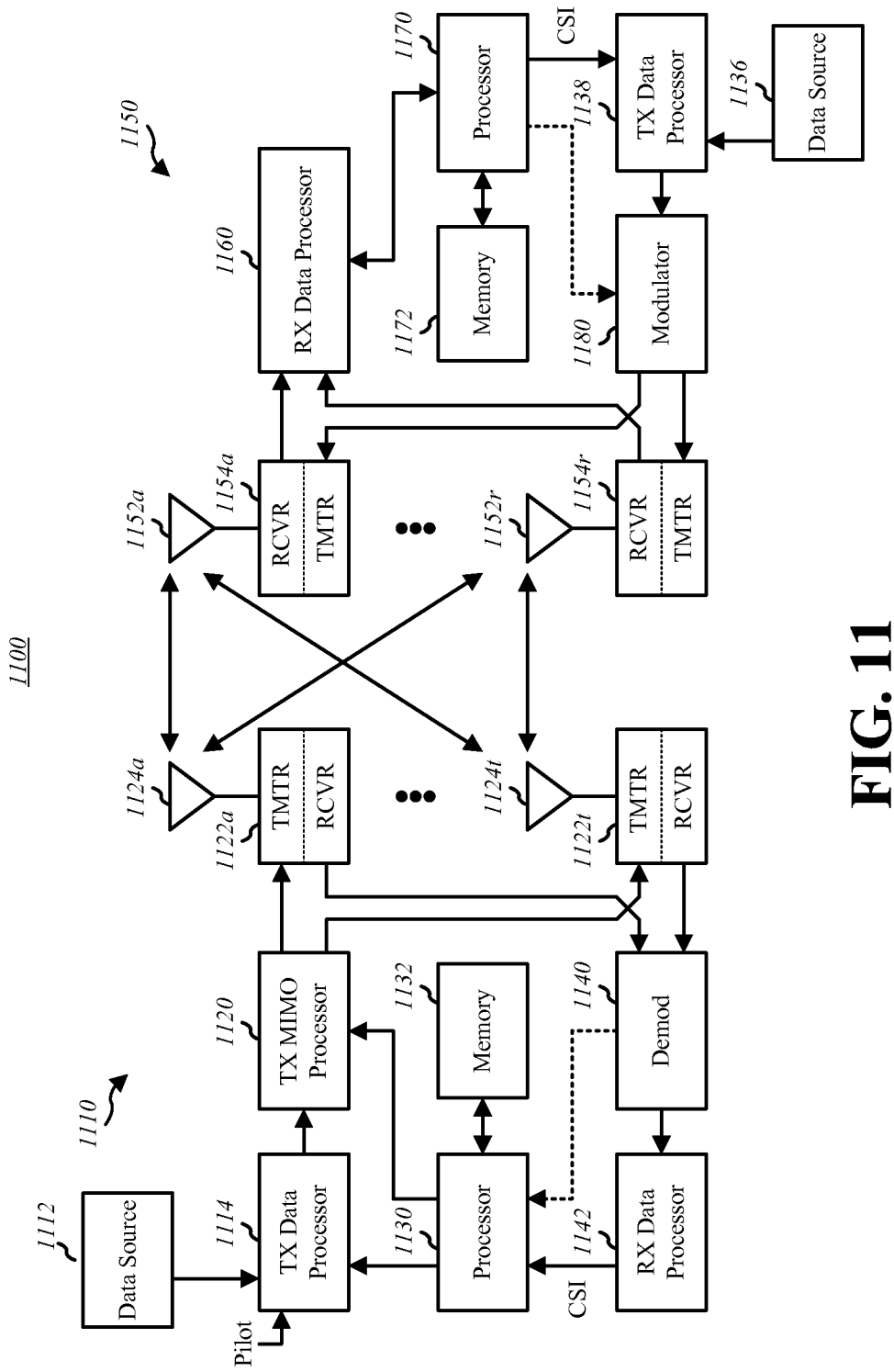

Referring to FIG. 11, a system 1100 illustrates a transmitter system 210 (also known as the access point) and a receiver system 1150 (also known as access terminal) in a MIMO system 1100. At the transmitter system 1110, traffic data for a number of data streams is provided from a data source 1112 to a transmit (TX) data processor 1114. Each data stream is transmitted over a respective transmit antenna. TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1130.

The modulation symbols for all data streams are then provided to a TX MIMO processor 1120, which may further process the modulation symbols (e.g., for OFDM). TX MIMO processor 1120 then provides NT modulation symbol streams to NT transmitters (TMTR) 1122a through 1122t. In certain embodiments, TX MIMO processor 1120 applies beam-forming weights to the symbols of the data streams and to the antenna from which the symbol is being transmitted.

Each transmitter 1122 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 1122a through 1122t are then transmitted from NT antennas 1124a through 1124t, respectively.

At receiver system 1150, the transmitted modulated signals are received by NR antennas 1152a through 1152r and the received signal from each antenna 1152 is provided to a respective receiver (RCVR) 1154a through 1154r. Each receiver 1154 conditions (e.g., filters, amplifies, and down-converts) a respective received signal, digitizes the conditioned signal to provide samples, and further processes the samples to provide a corresponding "received" symbol stream.

An RX data processor 1160 then receives and processes the NR received symbol streams from NR receivers 1154 based on a particular receiver processing technique to provide NT "detected" symbol streams. The RX data processor 1160 then demodulates, de-interleaves, and decodes each detected symbol stream to recover the traffic data for the data stream. The processing by RX data processor 1160 is complementary to that performed by TX MIMO processor 1120 and TX data processor 1114 at transmitter system 1110.

A processor 1170 periodically determines which pre-coding matrix to use (discussed below). Processor 1170 formulates a reverse link message comprising a matrix index portion and a rank value portion. The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by transmitters 1154a through 1154r, and transmitted back to transmitter system 1110. Parameters include resource allocation parameters, interference condition parameters, signal strength parameters, signal quality parameters, quality.

At transmitter system 1110, the modulated signals from receiver system 1150 are received by antennas 1124, conditioned by receivers 1122, demodulated by a demodulator 1140, and processed by a RX data processor 1142 to extract the reserve link message transmitted by the receiver system 1150. Processor 1130 then determines which pre-coding matrix to use for determining the beam-forming weights then processes the extracted message.

In one aspect, a method for wireless communications is provided. The method includes providing independent power controls for two or more carriers from a set of packet access signals; monitoring power across the two or more carriers to determine power levels for the set of packet access signals; and adjusting at least one of an open loop control, an inner loop control, or an outer loop control in view of the power levels for the set of packet access signals. This includes adjusting a physical random access channel (PRACH) and a dedicated physical control channel (DPCCH) power setting via the open loop control. The method includes starting a secondary uplink carrier later than an anchor in order that initial power can be dependent on the DPCCH. This includes setting an initial PRACH that is based on a Common Pilot Channel (CPICH), an uplink interference parameter, or a constant value or setting an initial DPCCH value based on an instantaneous power value, an anchor carrier value, or a margin value. The margin value is selected from an imbalance between carriers, initial data performance, or as a trade-off between power versus decoding error probability.

The method includes generating power up or power down bits as part of the inner loop control or sharing a maximum transmit power between at least two carriers. This includes staggering power up or power control down commands between at least two carriers or increasing power by similar proportions across multiple carriers. The method includes increasing power as much as possible on an anchor carrier and increasing power on a secondary carrier until a maximum transmit power is achieved. This includes increasing power on a carrier with a lower DPCCH power and increasing power on at least one other carrier until a maximum power is achieved. The method includes transmitting equal or unequal packet sizes on the secondary carrier or the primary carrier or generating one or more set points via the outer loop control. The set points are generated by a radio network controller (RNC). The method includes generating the set points by monitoring a signal to noise threshold, where the set point is associated with a multi path delay profile, a fading speed, a variation in interference, or a data rate.

In another aspect, a communications apparatus is provided. This includes a memory that retains instructions for providing independent power controls to two or more carriers from a set of packet access signals, determining power across the two or more carriers to determine power levels for the set of packet access signals, and monitoring at least one of an open loop control, an inner loop control, or an outer loop control in view of the power levels for the set of packet access signals; and a processor that executes the instructions. This includes instructions for adjusting a physical random access channel (PRACH) and a dedicated physical control channel (DPCCH) power setting via the open loop control. The apparatus can include a radio network controller to generate one or more control set points and a processor to generate one or more power up or power down commands.

In another aspect, a computer program product is provided. This includes a computer-readable medium that includes code for controlling power, the code comprising: code for causing a computer to control power for two or more carriers from a set of packet access signals; code for causing a computer to monitor power across the two or more carriers to determine power levels for the set of packet access signals; and code for causing a computer to automatically adjust at least one of an open loop control, an inner loop control, or an outer loop control in view of the power levels for the set of packet access signals. This also includes code for causing a computer to adjust power for a group of carriers in a sequential or a parallel manner.

In another aspect, a method for wireless communications is provided. This includes providing independent power controls for two or more carriers from a set of packet access signals; monitoring power across the two or more carriers to determine power levels for the set of packet access signals; and receiving at least one of an open loop control command, an inner loop control command, or an outer loop control command in view of the power levels for the set of packet access signals.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH), for example.

The UL PHY Channels comprises: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH), for example.

Other terms/components include: 3G 3rd Generation, 3GPP 3rd Generation Partnership Project, ACLR Adjacent channel leakage ratio, ACPR Adjacent channel power ratio, ACS Adjacent channel selectivity, ADS Advanced Design System, AMC Adaptive modulation and coding, A-MPR Additional maximum power reduction, ARQ Automatic repeat request, BCCH Broadcast control channel, BTS Base transceiver station, CDD Cyclic delay diversity, CCDF Complementary cumulative distribution function, CDMA Code division multiple access, CFI Control format indicator, Co-MIMO Cooperative MIMO, CP Cyclic prefix, CPICH Common pilot channel, CPRI Common public radio interface, CQI Channel quality indicator, CRC Cyclic redundancy check, DCI Downlink control indicator, DFT Discrete Fourier transform, DFT-SOFDM Discrete Fourier transform spread OFDM, DL Downlink (base station to subscriber transmission), DL-SCH Downlink shared channel, D-PHY 500 Mbps physical layer, DSP Digital signal processing, DT Development toolset, DVSA Digital vector signal analysis, EDA Electronic design automation, E-DCH Enhanced dedicated channel, E-UTRAN Evolved UMTS terrestrial radio access network, eMBMS Evolved multimedia broadcast multicast service, eNB Evolved Node B, EPC Evolved packet core, EPRE Energy per resource element, ETSI European Telecommunications Standards Institute, E-UTRA Evolved UTRA, E-UTRAN Evolved UTRAN, EVM Error vector magnitude, and FDD Frequency division duplex.

Still yet other terms include FFT Fast Fourier transform, FRC Fixed reference channel, FS1 Frame structure type 1, FS2 Frame structure type 2, GSM Global system for mobile communication, HARQ Hybrid automatic repeat request, HDL Hardware description language, HI HARQ indicator, HSDPA High speed downlink packet access, HSPA High speed packet access, HSUPA High speed uplink packet access, IFFT Inverse FFT, IOT Interoperability test, IP Internet protocol, LO Local oscillator, LTE Long term evolution, MAC Medium access control, MBMS Multimedia broadcast multicast service, MBSFN Multicast/broadcast over single-frequency network, MCH Multicast channel, MIMO Multiple input multiple output, MISO Multiple input single output, MME Mobility management entity, MOP Maximum output power, MPR Maximum power reduction, MU-MIMO Multiple user MIMO, NAS Non-access stratum, OBSAI Open base station architecture interface, OFDM Orthogonal frequency division multiplexing, OFDMA Orthogonal frequency division multiple access, PAPR Peak-to-average power ratio, PAR Peak-to-average ratio, PBCH Physical broadcast channel, P-CCPCH Primary common control physical channel, PCFICH Physical control format indicator channel, PCH Paging channel, PDCCH Physical downlink control channel, PDCP Packet data convergence protocol, PDSCH Physical downlink shared channel, PHICH Physical hybrid ARQ indicator channel, PHY Physical layer, PRACH Physical random access channel, PMCH Physical multicast channel, PMI Pre-coding matrix indicator, P-SCH Primary synchronization signal, PUCCH Physical uplink control channel, and PUSCH Physical uplink shared channel.

Other terms include QAM Quadrature amplitude modulation, QPSK Quadrature phase shift keying, RACH Random access channel, RAT Radio access technology, RB Resource block, RF Radio frequency, RFDE RF design environment, RLC Radio link control, RMC Reference measurement channel, RNC Radio network controller, RRC Radio resource control, RRM Radio resource management, RS Reference signal, RSCP Received signal code power, RSRP Reference signal received power, RSRQ Reference signal received quality, RSSI Received signal strength indicator, SAE System architecture evolution, SAP Service access point, SC-FDMA Single carrier frequency division multiple access, SFBC Space-frequency block coding, S-GW Serving gateway, SIMO Single input multiple output, SISO Single input single output, SNR Signal-to-noise ratio, SRS Sounding reference signal, S-SCH Secondary synchronization signal, SU-MIMO Single user MIMO, TDD Time division duplex, TDMA Time division multiple access, TR Technical report, TrCH Transport channel, TS Technical specification, TTA Telecommunications Technology Association, TTI Transmission time interval, UCI Uplink control indicator, UE User equipment, UL Uplink (subscriber to base station transmission), UL-SCH Uplink shared channel, UMB Ultra-mobile broadband, UMTS Universal mobile telecommunications system, UTRA Universal terrestrial radio access, UTRAN Universal terrestrial radio access network, VSA Vector signal analyzer, W-CDMA Wideband code division multiple access It is noted that various aspects are described herein in connection with a terminal. A terminal can also be referred to as a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

As used in this application, the terms "component," "module," "system," "protocol," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for wireless communications, comprising:
    providing independent power controls for two or more carriers from a set of packet access signals;
    monitoring power across the two or more carriers to determine power levels for the set of packet access signals; and
    adjusting at least one of an open loop control, an inner loop control, or an outer loop control in view of the power levels for the set of packet access signals.

2. The method of claim 1, further comprising adjusting a physical random access channel (PRACH) and a dedicated physical control channel (DPCCH) power setting via the open loop control.

3. The method of claim 2, further comprising starting a secondary uplink carrier later than an anchor in order that initial power of a second carrier can be dependent on the DPCCH power on an anchor or first carrier.

4. The method of claim 2, further comprising setting an initial PRACH that is based on a Common Pilot Channel (CPICH), an uplink interference parameter, or a constant value.

5. The method of claim 2, further comprising setting an initial DPCCH value based on an instantaneous power value, an anchor carrier value, or a margin value.

6. The method of claim 5, the margin value is selected from an imbalance between carriers, initial data performance, limiting initial interference, or as a trade-off between power versus decoding error probability.

7. The method of claim 1, further comprising generating power up or power down bits on each carrier independently as part of the inner loop control.

8. The method of claim 7, further comprising sharing a maximum transmit power between at least two carriers.

9. The method of claim 7, further comprising staggering power up or power control down commands between at least two carriers.

10. The method of claim 7, further comprising increasing power by similar proportions across multiple carriers.

11. The method of claim 7, further comprising increasing power as much as possible on an anchor carrier and increasing power on a secondary carrier until a maximum transmit power is achieved.

12. The method of claim 7, further comprising increasing power on a carrier with a lower DPCCH power and increasing power on at least one other carrier until a maximum power is achieved.

13. The method of claim 7, further comprising transmitting equal or unequal packet sizes on the secondary carrier or the primary carrier.

14. The method of claim 1, further comprising generating one or more set points via the outer loop control on a plurality of carriers.

15. The method of claim 14, the set points are generated by a radio network controller (RNC).

16. The method of claim 15, further comprising generating the set points by monitoring a signal to noise threshold.

17. The method of claim 16, the set point is associated with a multi path delay profile, a fading speed, a variation in interference, or a data rate.

18. A communications apparatus, comprising:
    a memory that retains instructions for providing independent power controls to two or more carriers from a set of packet access signals, determining power across the two or more carriers to determine power levels for the set of packet access signals, and monitoring at least one of an open loop control, an inner loop control, or an outer loop control in view of the power levels for the set of packet access signals; and
    a processor that executes the instructions.

19. The communications apparatus of claim 18, further comprising instructions for adjusting a physical random access channel (PRACH) and a dedicated physical control channel (DPCCH) power setting via the open loop control.

20. The communications apparatus of claim 19, further comprising instructions for starting a secondary uplink carrier later than an anchor in order that initial power can be dependent on the DPCCH.

21. The communications apparatus of claim 19, further comprising instructions for setting an initial PRACH that is based on a Common Pilot Channel (CPICH), an uplink interference parameter, or a constant value.

22. The communications apparatus of claim 19, further comprising instructions for setting an initial DPCCH value based on an instantaneous power value, an anchor carrier value, or a margin value.

23. The communications apparatus of claim 22, the margin value is selected from an imbalance between carriers, initial data performance, or as a trade-off between power versus decoding error probability.

24. The communications apparatus of claim 18, further comprising instructions for generating power up or power down bits as part of the inner loop control.

25. The communications apparatus of claim 24, further comprising instructions for increasing power by similar proportions across multiple carriers.

26. The communications apparatus of claim 24, further comprising instructions for increasing power as much as possible on an anchor carrier and increasing power on a secondary carrier until a maximum transmit power is achieved.

27. The communications apparatus of claim 24, further comprising instructions for generating one or more set points via the outer loop control.

28. A communications apparatus, comprising:
means for controlling two or more carriers in an independent manner from a set of packet access signals;
means for monitoring power levels for the set of packet access signals; and
means for controlling at least one of an open loop control, an inner loop control, or an outer loop control in view of the power levels for the set of packet access signals.

29. The communications apparatus of claim 28, further comprising a radio network controller to generate one or more control set points.

30. The communications apparatus of claim 29, further comprising a processor to generate one or more power up or power down commands.

31. A non-transitory computer program product, comprising:
a computer-readable medium that includes code for controlling power, the code comprising:
code for causing a computer to control power for two or more carriers from a set of packet access signals;
code for causing a computer to monitor power across the two or more carriers to determine power levels for the set of packet access signals; and
code for causing a computer to automatically adjust at least one of an open loop control, an inner loop control, or an outer loop control in view of the power levels for the set of packet access signals.

32. The non-transitory computer program product of claim 31, further comprising code for causing a computer to adjust power for a group of carriers in a sequential or a parallel manner.

33. A method for wireless communications, comprising:
providing independent power controls for two or more carriers from a set of packet access signals;
monitoring power across the two or more carriers to determine power levels for the set of packet access signals; and
receiving at least one of an open loop control command, an inner loop control command, or an outer loop control command in view of the power levels for the set of packet access signals.

34. The method of claim 33, further comprising adjusting a physical random access channel (PRACH) and a dedicated physical control channel (DPCCH) power setting via the open loop control.

35. The method of claim 33, further comprising monitoring one or more set points to adjust the power levels.

36. A communications apparatus, comprising:
means for controlling two or more carriers in an independent manner from a set of packet access signals;
means for monitoring power levels for the set of packet access signals; and
means for processing at least one of an open loop control command, an inner loop control command, or an outer loop control command in view of the power levels for the set of packet access signals.

37. The communications apparatus of claim 36, further comprising a radio network controller to generate one or more control set points.

* * * * *